United States Patent
Mori et al.

(10) Patent No.: US 12,412,931 B2
(45) Date of Patent: Sep. 9, 2025

(54) NON-AQUEOUS ELECTROLYTE SECONDARY BATTERY

(71) Applicant: SANYO Electric Co., Ltd., Kadoma (JP)

(72) Inventors: Shinya Mori, Hyogo (JP); Syunsuke Natsumeda, Osaka (JP); Tatsuya Akira, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 608 days.

(21) Appl. No.: 17/781,810

(22) PCT Filed: Nov. 25, 2020

(86) PCT No.: PCT/JP2020/043712
§ 371 (c)(1),
(2) Date: Jun. 2, 2022

(87) PCT Pub. No.: WO2021/117480
PCT Pub. Date: Jun. 17, 2021

(65) Prior Publication Data
US 2022/0399575 A1     Dec. 15, 2022

(30) Foreign Application Priority Data
Dec. 9, 2019    (JP) ................................ 2019-222471

(51) Int. Cl.
*H01M 10/0569*     (2010.01)
*H01M 4/02*     (2006.01)
(Continued)

(52) U.S. Cl.
CPC ....... *H01M 10/0569* (2013.01); *H01M 4/483* (2013.01); *H01M 4/587* (2013.01);
(Continued)

(58) Field of Classification Search
CPC ..... H01M 2004/021; H01M 2004/027; H02M 4/0404; H02M 4/133; H02M 4/1393; H02M 4/583
See application file for complete search history.

(56) References Cited

U.S. PATENT DOCUMENTS 5,677,082 A    10/1997    Greinke et al.
2001/0044045 A1*    11/2001    Sato ...................... H01G 11/84
429/231.95
(Continued)

FOREIGN PATENT DOCUMENTS

JP          9-171825 A      6/1997
JP          H09171825     *   6/1997
(Continued)

OTHER PUBLICATIONS

International Search Report dated Feb. 16, 2021, issued in counterpart International Application No. PCT/JP2020/043712 (3 pages).

*Primary Examiner* — Matthew W Van Oudenaren
(74) *Attorney, Agent, or Firm* — WHDA, LLP

(57) ABSTRACT

The purpose of the present disclosure is to provide a non-aqueous electrolyte secondary battery that can suppress reductions in rapid charge cycle characteristics. The non-aqueous electrolyte secondary battery according to one embodiment of the present disclosure has a positive electrode, a negative electrode, and a non-aqueous electrolyte. The negative electrode has a negative electrode collector and a negative electrode active material layer that is provided on the negative electrode collector. The negative electrode active material layer includes graphite particles A and graphite particles B as negative electrode active materials. The internal porosity of graphite particles A is no more than 5%, and the internal porosity of graphite particles B is 8%-20%. When the negative electrode active material layer is bisected in the thickness direction, there is a greater amount of graphite particles A in the outer surface-side half than in the negative electrode collector-side half.

4 Claims, 2 Drawing Sheets

(51) Int. Cl.
    *H01M 4/48*           (2010.01)
    *H01M 4/587*         (2010.01)

(52) U.S. Cl.
    CPC ................ *H01M 2004/021* (2013.01); *H01M 2004/027* (2013.01); *H01M 2300/0028* (2013.01)

(56) References Cited

U.S. PATENT DOCUMENTS

| | | | |
|---|---|---|---|
| 2002/0009646 A1* | 1/2002 | Matsubara | H01M 4/04 |
| | | | 429/232 |
| 2018/0190985 A1* | 7/2018 | Choi | H01M 10/052 |
| 2021/0013496 A1 | 1/2021 | Tsuzuki et al. | |
| 2021/0218014 A1 | 7/2021 | Sakitani et al. | |
| 2022/0131131 A1 | 4/2022 | Natsumeda et al. | |

FOREIGN PATENT DOCUMENTS

| | | | |
|---|---|---|---|
| JP | 9-320600 A | | 12/1997 |
| JP | 2012216537 | * | 11/2012 |
| JP | 2014-67638 A | | 4/2014 |
| JP | 2015-185443 A | | 10/2015 |
| KR | 10-2018-0125312 A | | 11/2018 |
| WO | 2013/021443 A1 | | 2/2013 |
| WO | 2019/187537 A1 | | 10/2019 |
| WO | 2020/044930 A1 | | 3/2020 |
| WO | 2020/175361 A1 | | 9/2020 |

* cited by examiner

Figure 2
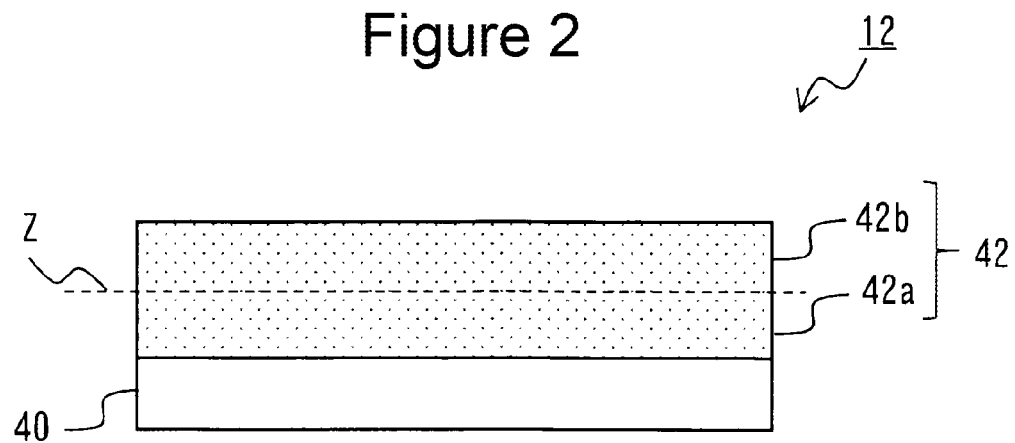
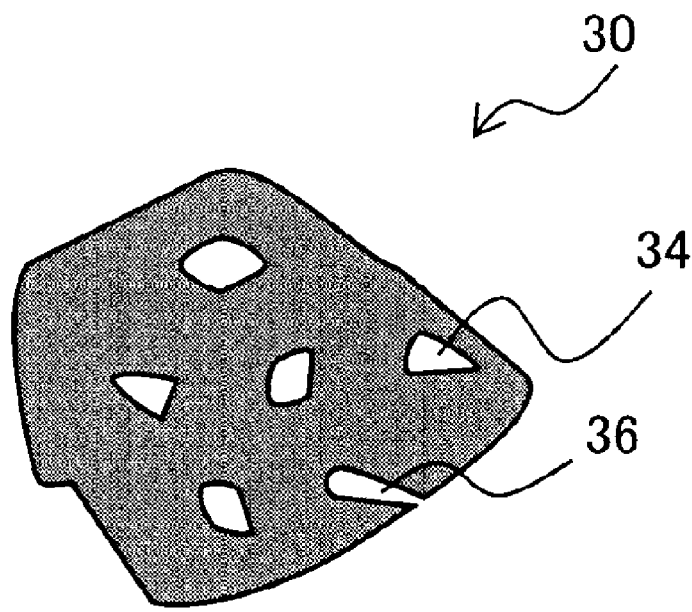
Figure 3

NON-AQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2020/043712 filed on Nov. 25, 2020 which claims the benefit of priority under 35 U.S.C. § 119(a) of Japanese Patent Application No. 2019-222471 filed in Japan on Dec. 9, 2019, the contents of which are incorporated herein by reference.

TECHNICAL FIELD

The present disclosure relates to a non-aqueous electrolyte secondary battery.

BACKGROUND

A non-aqueous electrolyte secondary battery using a carbon material as a negative electrode active material is widely used as a secondary battery having a high energy density.

Patent Literature 1, for example, discloses a non-aqueous electrolyte secondary battery using densified carbon having an internal porosity of 5% or less as a carbon material.

Patent Literature 2, for example, discloses a non-aqueous electrolyte secondary battery using a carbon material containing a carbon material A having an internal porosity of 1% or more and less than 23% and a carbon material B having an internal porosity of 23% or more and 40% or less.

CITATION LIST

Patent Literature

Patent Literature 1: JP H9-320600 A
Patent Literature 2: JP 2014-67638 A

SUMMARY

Technical Problem

However, in the conventional non-aqueous electrolyte secondary battery, when a rapid charge cycle in which charging is performed at a high rate in order to shorten the charging time is performed, there is a problem that the battery capacity decreases.

Therefore, an object of the present disclosure is to provide a non-aqueous electrolyte secondary battery capable of suppressing deterioration of rapid charge cycle characteristics.

Solution to Problem

A non-aqueous electrolyte secondary battery according to an aspect of the present disclosure includes: a positive electrode; a negative electrode; and a non-aqueous electrolyte solution, wherein the negative electrode includes a negative electrode current collector and a negative electrode active material layer provided on the negative electrode current collector, the negative electrode active material layer contains graphite particles A and graphite particles B as a negative electrode active material, an internal porosity of the graphite particles A is 5% or less, and an internal porosity of the graphite particles B is 8% to 20%, the graphite particles A are contained more in a half region on an outer surface side of the negative electrode active material layer than in a half region on a negative electrode current collector side of the negative electrode active material layer when the negative electrode active material layer is divided into two equal parts in a thickness direction, the non-aqueous electrolyte solution has a non-aqueous solvent containing a carboxylic acid ester represented by general formula (I), and the carboxylic acid ester is contained in an amount of 5 vol % to 50 vol % with respect to a total of the non-aqueous solvent:

[Chemical Formula 1]

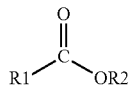

(I)

where R1 and R2 are each independently a hydrocarbon group having two or less carbon atoms.

Advantageous Effects of Invention

According to an aspect of the present disclosure, it is possible to suppress deterioration of rapid charge cycle characteristics.

BRIEF DESCRIPTION OF DRAWINGS

FIG. 2 is a cross-sectional view of a negative electrode as an example of an embodiment.

FIG. 3 is a cross-sectional view of a graphite particle in a negative electrode active material layer.

DESCRIPTION OF EMBODIMENTS

Figure 1:
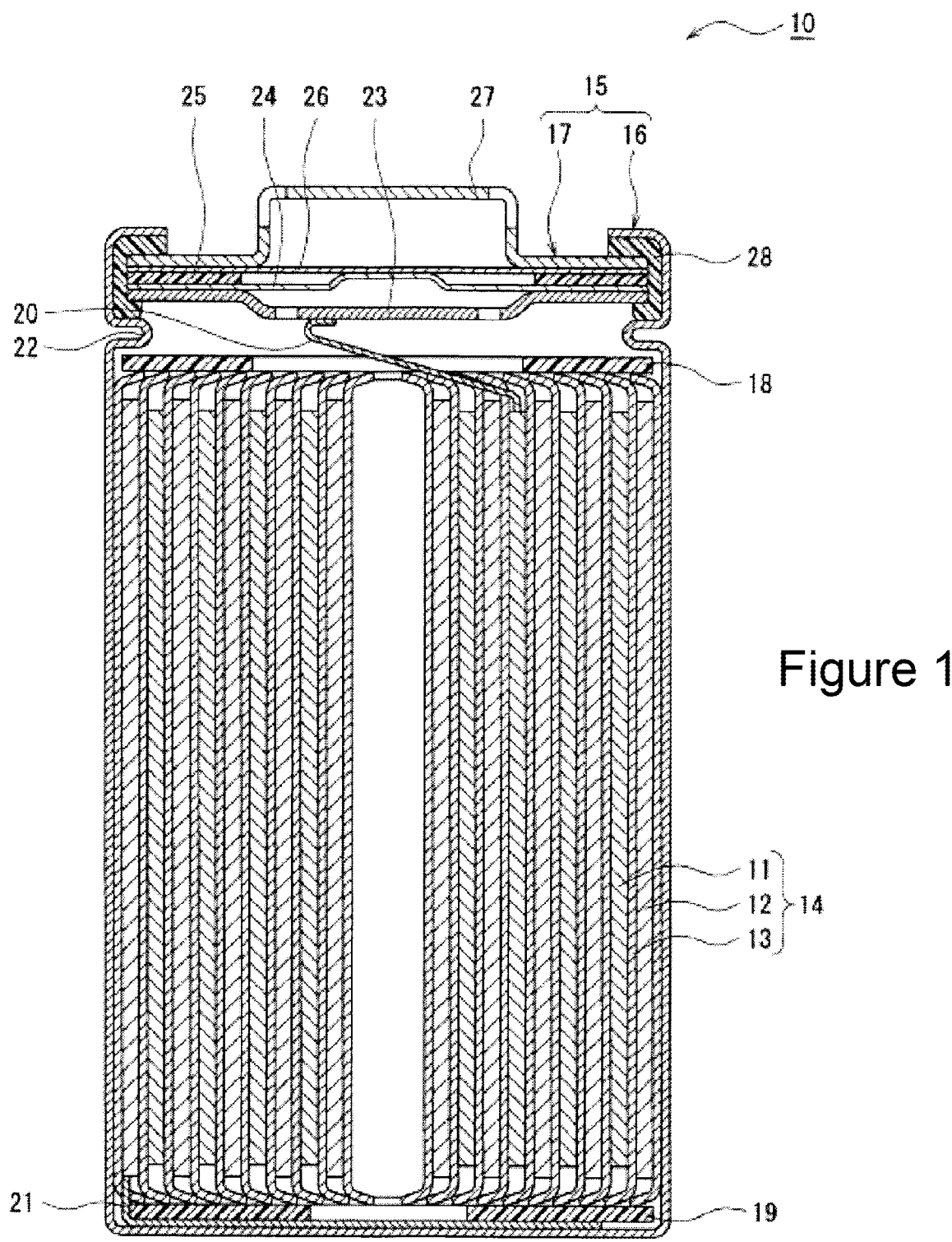
FIG. 1 is a cross-sectional view of a non-aqueous electrolyte secondary battery as an example of an embodiment.

A non-aqueous electrolyte secondary battery according to an aspect of the present disclosure includes: a positive electrode; a negative electrode; and a non-aqueous electrolyte solution, wherein the negative electrode includes a negative electrode current collector and a negative electrode active material layer provided on the negative electrode current collector, the negative electrode active material layer contains graphite particles A and graphite particles B as a negative electrode active material, an internal porosity of the graphite particles A is 5% or less, and an internal porosity of the graphite particles B is 8% to 20%, the graphite particles A are contained more in a half region on an outer surface side of the negative electrode active material layer than in a half region on a negative electrode current collector side of the negative electrode active material layer when the negative electrode active material layer is divided into two equal parts in a thickness direction, the non-aqueous electrolyte solution has a non-aqueous solvent containing a carboxylic acid ester represented by general formula (I), and the carboxylic acid ester is contained in an amount of 5 vol % to 50 vol % with respect to a total of the non-aqueous solvent:

[Chemical Formula 2]

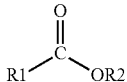

(I)

where R1 and R2 are each independently a hydrocarbon group having two or less carbon atoms.

In the graphite particles A having an internal porosity of 5% or less, the decomposition reaction of the non-aqueous electrolyte solution is suppressed as compared with graphite particles having an internal porosity of more than 5%. In addition, the decomposition reaction of the non-aqueous electrolyte solution occurs mainly on the surface of the negative electrode. It is therefore considered that as in the present disclosure, the graphite particles A having an internal porosity of 5% or less are contained more in the half region on the outer surface side of the negative electrode active material layer than in the half region on the negative electrode current collector side of the negative electrode active material layer, whereby the decomposition reaction of the non-aqueous electrolyte solution is suppressed even under severe conditions such as rapid charging. On the other hand, the graphite particles A having an internal porosity of 5% or less are less likely to be crushed when an electrode is formed, and therefore the binding property with the negative electrode current collector is lower than that of the graphite particles having an internal porosity of more than 5%. However, in the present disclosure, since there are few graphite particles A having an internal porosity of 5% or less in the half region on the negative electrode current collector side of the negative electrode active material layer, it is considered that adhesiveness between the negative electrode current collector and the graphite particles is easily secured, and the graphite particles are hardly peeled off from the negative electrode current collector even under severe conditions such as rapid charging. Furthermore, since the non-aqueous electrolyte solution containing a predetermined amount of the carboxylic acid ester has a lower viscosity than that of a non-aqueous electrolyte solution containing no carboxylic acid ester and thus has improved permeability into the positive and negative electrode active material layers, it is considered that an efficient battery reaction is performed even under severe conditions such as rapid charging. From these facts, it is considered that according to the non-aqueous electrolyte secondary battery of an aspect of the present disclosure, deterioration of rapid charge cycle characteristics is suppressed.

Hereinafter, an example of an embodiment will be described in detail with reference to the drawings. The non-aqueous electrolyte secondary battery of the present disclosure is not limited to the embodiments described below. The drawings referred to in the description of the embodiments are schematically illustrated.

FIG. 1 is a cross-sectional view of a non-aqueous electrolyte secondary battery as an example of an embodiment. A non-aqueous electrolyte secondary battery 10 illustrated in FIG. 1 includes a wound electrode assembly 14 formed by winding a positive electrode 11 and a negative electrode 12 with a separator 13 interposed therebetween, a non-aqueous electrolyte solution, insulating plates 18 and 19 respectively disposed above and below the electrode assembly 14, and a battery case 15 housing the above-described members. The battery case 15 includes a bottomed cylindrical case body 16 and a sealing assembly 17 that closes an opening of the case body 16. Instead of the wound electrode assembly 14, another form of electrode assembly such as a stacked electrode assembly in which a positive electrode and a negative electrode are alternately stacked with a separator interposed therebetween may be applied. Examples of the battery case 15 include metal exterior cans having a cylindrical shape, a rectangular shape, a coin shape, a button shape, or the like, and a pouch exterior body formed by laminating a resin sheet and a metal sheet.

The case body 16 is, for example, a bottomed cylindrical metal exterior can. A gasket 28 is provided between the case body 16 and the sealing assembly 17 to secure the sealing property of the inside of the battery. The case body 16 has, for example, a protruding portion 22 which supports the sealing assembly 17 and in which a part of a side surface portion extends inward. The protruding portion 22 is preferably formed in an annular shape along the circumferential direction of the case body 16, and supports the sealing assembly 17 on the upper surface thereof.

The sealing assembly 17 has a structure in which a filter 23, a lower valve member 24, an insulating member 25, an upper valve member 26, and a cap 27 are stacked in this order from the electrode assembly 14 side. Each member constituting the sealing assembly 17 has, for example, a disk shape or a ring shape, and the members excluding the insulating member 25 are electrically connected to each other. The lower valve member 24 and the upper valve member 26 are connected to each other at each of the central portions thereof, and the insulating member 25 is interposed between the peripheral portions of these valve bodies. When the internal pressure of the non-aqueous electrolyte secondary battery 10 increases due to heat generation caused by an internal short circuit or the like, for example, the lower valve member 24 deforms and breaks so as to push up the upper valve member 26 toward the cap 27, and the current path between the lower valve member 24 and the upper valve member 26 is cut off. When the internal pressure further increases, the upper valve member 26 breaks, and the gas is discharged from the opening of the cap 27.

In the non-aqueous electrolyte secondary battery 10 illustrated in FIG. 1, a positive electrode lead 20 attached to the positive electrode 11 extends to the sealing assembly 17 side through a through hole of the insulating plate 18, and a negative electrode lead 21 attached to the negative electrode 12 extends toward the bottom side of the case body 16 through the outside of the insulating plate 19. The positive electrode lead 20 is connected to the lower surface of the filter 23 which is the bottom plate of the sealing assembly 17 by welding or the like, and the cap 27 which is the top plate of the sealing assembly 17 electrically connected to the filter 23 serves as a positive electrode terminal. The negative electrode lead 21 is connected to the inner surface of the bottom portion of the case body 16 by welding or the like, and the case body 16 serves as a negative electrode terminal.

Hereinafter, each component of the non-aqueous electrolyte secondary battery 10 will be described in detail.
[Negative Electrode]

FIG. 2 is a cross-sectional view of a negative electrode as an example of an embodiment. The negative electrode 12 includes a negative electrode current collector 40 and a negative electrode active material layer 42 provided on the negative electrode current collector 40.

As the negative electrode current collector 40, for example, a foil of a metal which is stable in a potential range of the negative electrode, such as copper, a film in which the metal is disposed on a surface layer thereof, or the like is used.

The negative electrode active material layer 42 contains graphite particles as a negative electrode active material. The negative electrode active material layer 42 preferably contains a binder or the like. The negative electrode 12 can be produced, for example, by preparing a negative electrode mixture slurry containing a negative electrode active material, a binder, and the like, applying the negative electrode mixture slurry onto the negative electrode current collector 40, drying the slurry to form the negative electrode active material layer 42, and rolling the negative electrode active material layer 42. The method for producing the negative electrode active material layer 42 will be described later in detail.

FIG. 3 is a cross-sectional view of a graphite particle in a negative electrode active material layer. As illustrated in FIG. 3, a graphite particle 30 has a closed void 34 (hereinafter, internal void 34) that is not connected from the inside of the particle to the surface of the particle and a void 36 (hereinafter, external void 36) that is connected from the inside of the particle to the surface of the particle in the cross-sectional view of the graphite particle 30.

The graphite particle 30 in the present embodiment includes a graphite particle A having an internal porosity of 5% or less and a graphite particle B having an internal porosity of 8% to 20%. The internal porosity of the graphite particles A may be 5% or less, but is preferably 1% to 5%, and more preferably 3% to 5%, from the viewpoint of suppressing deterioration of rapid charge cycle characteristics, and the like. The internal porosity of the graphite particles B may be 8% to 20%, but is preferably 10% to 18%, and more preferably 12% to 16%, from the viewpoint of suppressing deterioration of rapid charge cycle characteristics, and the like. Here, the internal porosity of the graphite particle is a two-dimensional value obtained from the ratio of the area of the internal void 34 of the graphite particle to the cross-sectional area of the graphite particle. The internal porosity of the graphite particle is determined by the following procedure.

<Method for Measuring Internal Porosity>

(1) The cross section of the negative electrode active material layer is exposed. Examples of the method for exposing the cross section include a method in which a part of the negative electrode is cut out and processed by an ion milling apparatus (for example, IM 4000 PLUS, manufactured by Hitachi High-Tech Corporation) to expose the cross section of the negative electrode active material layer.

(2) A reflected electron image of the cross section of the exposed negative electrode active material layer is taken using a scanning electron microscope. The magnification at the time of taking the reflected electron image is 3,000 times to 5,000 times.

(3) The cross-sectional image obtained as described above is taken into a computer, and binarized using image analysis software (for example, ImageJ, manufactured by National Institutes of Health, USA) to obtain a binarized image in which the particle cross section in the cross-sectional image is converted into black and voids present in the particle cross section are converted into white.

(4) Graphite particles A and B having a particle size of 5 μm to 50 μm are selected from the binarized image, and the area of the cross section of the graphite particle and the area of internal voids present in the cross section of the graphite particle are calculated. Here, the area of the cross section of the graphite particle refers to the area of a region surrounded by the outer periphery of the graphite particle, that is, the area of the entire cross section portion of the graphite particle. In addition, for voids having a width of 3 μm or less among voids present in the cross section of the graphite particle, it may be difficult to determine whether the voids are internal voids or external voids in image analysis, and thus voids having a width of 3 μm or less may be considered to be internal voids. Then, the internal porosity of the graphite particle (the area of the internal voids of the cross section of the graphite particle×100/the area of the cross section of the graphite particle) is calculated from the calculated area of the cross section of the graphite particle and area of the internal voids of the cross section of the graphite particle. The internal porosities of the graphite particles A and B are an average value of 10 graphite particles A and graphite particles B.

The graphite particles A and B are produced, for example, as follows.

<Graphite Particles A Having Internal Porosity of 5% or Less>

For example, coke (precursor) as a main raw material is pulverized into a predetermined size, the pulverized coke is aggregated with a binder, and then the coke is fired at a temperature of 2,600° C. or higher to be graphitized and sieved to obtain graphite particles A having a desired size. Here, the internal porosity can be adjusted to 5% or less depending on the particle size of the precursor after pulverization, the particle size of the precursor in an aggregated state, and the like. The average particle size (volume-based median diameter D50) of the precursor after pulverization is preferably in the range of 12 μm to 20 μm, for example. When the internal porosity is reduced to 5% or less, it is preferable to increase the particle size of the precursor after pulverization.

<Graphite Particles B Having Internal Porosity of 8% to 20%>

For example, coke (precursor) as a main raw material is pulverized into a predetermined size, the pulverized coke is aggregated with a binder, and then the coke is further pressure-formed into a block shape and then fired at a temperature of 2,600° C. or higher to be graphitized. The block-shaped formed body after graphitization is pulverized and sieved to obtain graphite particles B having a desired size. Here, the internal porosity can be adjusted to 8% to 20% depending on the amount of the volatile component added to the block-shaped formed body. When a part of the binder added to the coke (precursor) volatilizes during firing, the binder can be used as a volatile component. As such a binder, pitch is exemplified.

The graphite particles A and B used in the present embodiment are natural graphite, artificial graphite, and the like, and are not particularly limited, but artificial graphite is preferable from the viewpoint of ease of adjusting the internal porosity and the like. The interplanar spacing ($d_{002}$) of the (002) plane of the graphite particles A and B used in the present embodiment as measured by a wide angle X-ray diffraction method is, for example, preferably 0.3354 nm or more, more preferably 0.3357 nm or more, and preferably less than 0.340 nm, more preferably 0.338 nm or less. In addition, the crystallite size (Lc (002)) of the graphite particles A and B used in the present embodiment determined by an X-ray diffraction method is, for example, preferably 5 nm or more, more preferably 10 nm or more, and preferably 300 nm or less, more preferably 200 nm or less. When the interplanar spacing ($d_{002}$) and the crystallite size (Lc(002)) satisfy the above ranges, the battery capacity of the non-aqueous electrolyte secondary battery tends to be larger than the case where the above ranges are not satisfied.

In the present embodiment, the graphite particles A are contained more in a region 42b which is a half region on the outer surface side than in a region 42a which is a half region on the negative electrode current collector side when the negative electrode active material layer 42 illustrated in FIG. 2 is divided into two equal parts in the thickness direction. As a result, in the rapid charge cycle, for example, the decomposition of the non-aqueous electrolyte solution is suppressed, or the graphite particles are suppressed from peeling off from the negative electrode current collector 40, so that the deterioration of rapid charge cycle characteristics is suppressed. The phrase "the negative electrode active material layer 42 is divided into two equal parts in the thickness direction" means that when the stacking direction of the negative electrode current collector 40 and the negative electrode active material layer 42 is defined as the thickness direction of the negative electrode active material layer 42, the negative electrode active material layer 42 is divided into two equal parts at an intermediate Z of the thickness of the negative electrode active material layer 42. Then, among the two equal parts divided in the thickness direction of the negative electrode active material layer 42, a part of the negative electrode active material layer 42 located close to the negative electrode current collector 40 is defined as the region 42a which is a half region on the negative electrode current collector side, and a part of the negative electrode active material layer 42 located far from the negative electrode current collector 40 is defined as a region 42b which is a half region on the outer surface side.

In the present embodiment, the graphite particles A may be contained more in the region 42b which is a half region on the outer surface side than in the region 42a which is a half region on the negative electrode current collector side, and from the viewpoint of further suppressing deterioration of rapid charge cycle characteristics, the ratio of the graphite particles A to the graphite particles B in the region 42b which is a half region on the outer surface is preferably 20:80 to 100:0, and more preferably 50:50 to 100:0 in mass ratio. In addition, the ratio of the graphite particles A to the graphite particles B in the region 42a which is a half region on the negative electrode current collector side is preferably 10:90 to 0:100, and more preferably 0:100 in mass ratio from the viewpoint of suppressing deterioration of rapid charge-discharge cycle characteristics.

An example of a method for producing the negative electrode active material layer 42 will be described. For example, a negative electrode active material containing graphite particles B (as necessary, graphite particles A), a binder, and a solvent such as water are mixed to prepare a negative electrode mixture slurry for the negative electrode current collector side. Separately from this, a negative electrode active material containing graphite particles A (as necessary, graphite particles B) in an amount larger than that of the negative electrode mixture slurry for the negative electrode current collector side, a binder, and a solvent such as water are mixed to prepare a negative electrode mixture slurry for the outer surface side. Then, the negative electrode mixture slurry for the negative electrode current collector side is applied onto both surfaces of the negative electrode current collector and dried, and then the negative electrode mixture slurry for the outer surface side is applied onto both surfaces of the coating film of the negative electrode mixture slurry for the negative electrode current collector side and dried, whereby the negative electrode active material layer 42 can be formed. In the above method, the negative electrode mixture slurry for the negative electrode current collector side is applied and dried, and then the negative electrode mixture slurry for the outer surface side is applied, but a method of applying the negative electrode mixture slurry for the outer surface side after applying the negative electrode mixture slurry for the negative electrode current collector side and before drying may be used, or the negative electrode mixture slurry for the negative electrode current collector side and the negative electrode mixture slurry for the outer surface side may be applied simultaneously.

The negative electrode active material may contain other materials capable of reversibly absorbing and releasing lithium ions in addition to the graphite particles A and B used in the present embodiment, and may contain, for example, a Si-based material. Examples of the Si-based material include Si, alloys containing Si, and silicon oxides such as $SiO_x$ (x is 0.8 to 1.6). The Si-based material is a negative electrode material capable of improving the battery capacity as compared with the graphite particles. On the other hand, the Si-based material is disadvantageous in terms of rapid charge cycle characteristics because the volume expansion of the Si-based material associated with charge and discharge is large. However, in the negative electrode active material layer having a negative electrode active material containing the graphite particles A and B and the Si-based material, when the amount of the graphite particles A is increased in the half region on the outer surface side rather than the half region on the negative electrode current collector side, deterioration of rapid charge cycle characteristics can be suppressed as compared with the case where the graphite particles A are uniformly dispersed in the negative electrode active material layer. The content of the Si-based material is, for example, preferably 1 mass % to 10 mass %, and more preferably 3 mass % to 7 mass %, with respect to the mass of the negative electrode active material, from the viewpoint of improving the battery capacity, suppressing deterioration of rapid charge cycle characteristics, and the like.

Other examples of the other materials capable of reversibly absorbing and releasing lithium ions include metals alloyed with lithium, such as tin (Sn), and alloys and oxides containing metal elements such as Sn. The negative electrode active material may contain the other materials, and the content of the other material is desirably, for example, 10 mass % or less with respect to the mass of the negative electrode active material.

Examples of the binder include a fluorine resin, PAN, a polyimide resin, an acrylic resin, a polyolefin resin, styrene-butadiene rubber (SBR), nitrile-butadiene rubber (NBR), carboxymethyl cellulose (CMC) or a salt thereof, polyacrylic acid (PAA) or a salt thereof (PAA-Na, PAA-K, or the like, and partially neutralized salts may be used), and polyvinyl alcohol (PVA). These may be used singly or in combination of two or more types thereof.

[Positive Electrode]

The positive electrode 11 includes, for example, a positive electrode current collector such as a metal foil and a positive electrode active material layer formed on the positive electrode current collector. As the positive electrode current collector, a foil of a metal which is stable in a potential range of the positive electrode, such as aluminum, a film in which the metal is disposed on a surface layer thereof, or the like can be used. The positive electrode active material layer contains, for example, a positive electrode active material, a binder, a conductive material, and the like.

The positive electrode 11 can be produced, for example, by applying a positive electrode mixture slurry containing a positive electrode active material, a binder, a conductive material, and the like onto a positive electrode current collector, drying the slurry to form a positive electrode active material layer, and then rolling the positive electrode active material layer.

Examples of the positive electrode active material include lithium transition metal oxides containing transition metal elements such as Co, Mn, and Ni. Examples of the lithium transition metal oxide include $Li_xCoO_2$, $Li_xNiO_2$, $Li_xMnO_2$, $Li_xCo_yNi_{1-y}O_2$, $Li_xCo_yM_{1-y}O_2$, $Li_xNi_{1-y}M_yO_z$, $Li_xMn_2O_4$, $Li_xMn_{2-y}M_yO_4$, $LiMPO_4$, and $Li_2MPO_4F$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used singly or in combination of two or more types thereof. The positive electrode active material preferably contains a lithium-nickel composite oxide such as $Li_xNiO_2$, $Li_xCo_yNi_{1-y}O_2$ or $Li_xNi_{1-y}M_yO_z$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$) from the viewpoint of being able to increase the capacity of the non-aqueous electrolyte secondary battery.

Examples of the conductive material include carbon particles such as carbon black (CB), acetylene black (AB), Ketjen black, and graphite. These may be used singly or in combination of two or more types thereof.

Examples of the binder include fluorine resins such as polytetrafluoroethylene (PTFE) and polyvinylidene fluoride (PVdF), polyacrylonitrile (PAN), polyimide resins, acrylic resins, and polyolefin resins. These may be used singly or in combination of two or more types thereof.

[Non-Aqueous Electrolyte Solution]

The non-aqueous electrolyte solution has a non-aqueous solvent containing a carboxylic acid ester represented by general formula (I). The carboxylic acid ester represented by general formula (I) is contained in an amount of 5 vol % to 50 vol % with respect to the total of the non-aqueous solvent.

[Chemical Formula 3]

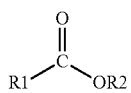

(I)

where R1 and R2 are each independently a hydrocarbon group having two or less carbon atoms.

By using a non-aqueous electrolyte solution containing a predetermined amount of the carboxylic acid ester represented by general formula (I), for example, the permeability of the non-aqueous electrolyte solution into the positive and negative electrode active material layers is improved due to the low viscosity of the non-aqueous electrolyte solution. As a result, an efficient battery reaction is performed even under severe conditions such as rapid charging, and deterioration of rapid charge cycle characteristics is suppressed. When the content of the carboxylic acid ester represented by general formula (I) exceeds 50 vol % with respect to the total of the non-aqueous solvent, for example, the decomposition reaction of the non-aqueous electrolyte solution is likely to occur, and deterioration of rapid charge cycle characteristics cannot be sufficiently suppressed. The content of the carboxylic acid ester represented by general formula (I) is preferably in the range of 30 vol % to 50 vol %, and more preferably in the range of 35 vol % to 45 vol %, with respect to the total of the non-aqueous solvent, from the viewpoint of suppressing deterioration of rapid charge cycle characteristics and exhibiting excellent battery resistance in a low-temperature environment, and the like.

Examples of the hydrocarbon group having two or less carbon atoms include an alkyl group having two or less carbon atoms, an alkynyl group having two carbon atoms, and an alkenyl group having two carbon atoms. Examples of the alkyl group having two or less carbon atoms include a methyl group and an ethyl group. Examples of the alkynyl group having two carbon atoms include an ethynyl group. Examples of the alkenyl group having two carbon atoms include an ethenyl group. The hydrogen atom of the alkyl group, the alkenyl group, and the alkynyl group may be substituted with a foreign element as necessary. The foreign element is not particularly limited, and examples thereof include fluorine, chlorine, and bromine.

Examples of the carboxylic acid ester represented by general formula (I) include methyl acetate, ethyl acetate, methyl propionate, and ethyl propionate. Among them, methyl acetate is preferable from the viewpoint of further suppressing deterioration of rapid charge cycle characteristics. These may be used singly or in combination of two or more types thereof.

The non-aqueous solvent may contain, for example, a non-aqueous solvent other than the carboxylic acid ester represented by general formula (I). As another non-aqueous solvent, for example, esters, ethers, nitriles such as acetonitrile, amides such as dimethylformamide, and mixed solvents of two or more types thereof can be used. The non-aqueous solvent may contain a halogen-substituted compound in which at least a part of the hydrogen atom in these solvents is substituted with a halogen atom such as fluorine.

Examples of the esters include cyclic carbonic acid esters such as ethylene carbonate (EC), propylene carbonate (PC), and butylene carbonate; chain carbonic acid esters such as dimethyl carbonate (DMC), methyl ethyl carbonate (MEC), diethyl carbonate (DEC), methyl propyl carbonate, ethyl propyl carbonate, and methyl isopropyl carbonate; cyclic carboxylic acid esters such as γ-butyrolactone and γ-valerolactone; and chain carboxylic acid esters such as propyl acetate and propyl propionate. The chain carboxylic acid ester is a carboxylic acid ester other than the carboxylic acid ester represented by general formula (I).

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ether; and chain ethers such as 12-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxy ethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

As the halogen-substituted compound, it is preferable to use a fluorinated cyclic carbonic acid ester such as fluoroethylene carbonate (FEC), a fluorinated chain carbonic acid ester, or the like.

The non-aqueous electrolyte solution contains an electrolyte salt. The electrolyte salt is preferably a lithium salt. Examples of the lithium salt include borates such as $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, n is 1 or 2), $LiB_{10}Cl_{10}$, $LiCl$, $LiBr$, $LiI$, chloroborane lithium, lithium lower aliphatic carboxylate, $Li_2B_4O_7$, and Li(B(C$_2$O$_4$)F$_2$), and imide salts such as LiN(SO$_2$CF$_3$)$_2$ and LiN(C$_l$F$_{2l+1}$SO$_2$(C$_m$F$_{2m+1}$SO$_2$) {l and m are integers of 0 or more}. These lithium salts may be used singly or in combination of two or more types thereof. Among them, LiPF$_6$ is preferably used from the viewpoint of ionic conductivity, electrochemical stability, and the like. The concentration of the lithium salt is preferably 0.8 to 1.8 mol per 1 L of the non-aqueous solvent.

The viscosity of the non-aqueous electrolyte solution is, for example, preferably 3.1 cP or less, more preferably 2.8 cP or less, and still more preferably 2.5 cP or less, from the viewpoint of further suppressing deterioration of rapid charge cycle characteristics.

[Separator]

As the separator 13, for example, a porous sheet having ion permeability and insulating property is used. Specific examples of the porous sheet include a microporous thin film, a woven fabric, and a nonwoven fabric. As a material of the separator, an olefin resin such as polyethylene or polypropylene, cellulose, or the like is suitable. The separator 13 may be a laminate including a cellulose fiber layer and a thermoplastic resin fiber layer of an olefin resin or the like. In addition, a multilayer separator including a polyethylene layer and a polypropylene layer may be used, and a separator having a surface coated with a material such as an aramid resin or ceramic may be used.

EXAMPLES

Hereinafter, the present disclosure will be further described with reference to examples, but the present disclosure is not limited to these examples.

Example 1

[Production of Positive Electrode]

As a positive electrode active material, aluminum-containing lithium nickel cobalt oxide (LiNi$_{0.88}$Co$_{0.09}$Al$_{0.03}$O$_2$) was used. First, 100 parts by mass of the positive electrode active material, 1 part by mass of acetylene black, and 0.9 parts by mass of polyvinylidene fluoride were mixed in a solvent of N-methyl-2-pyrrolidone (NMP) to prepare a positive electrode mixture slurry. This slurry was applied to both surfaces of an aluminum foil having a thickness of 15 μm, the coating film was dried, and then the coating film was rolled by a rolling roller to produce a positive electrode in which a positive electrode active material layer was formed on both surfaces of a positive electrode current collector. The produced positive electrode was cut to a width of 57.6 mm and a length of 679 mm and used.

[Production of Graphite Particles A]

Coke was pulverized until the average particle size (median diameter D50) thereof reached 12 μm. Pitch as a binder was added to the pulverized coke, and the coke was aggregated until the average particle size (median diameter D50) thereof reached 17 μm. This aggregate was fired at a temperature of 2,800° C. to be graphitized, and then sieved using a 250 mesh sieve to obtain graphite particles A having an average particle size (median diameter D50) of 23 μm.

[Production of Graphite Particles B]

Coke was pulverized until the average particle size (median diameter D50) thereof reached 15 μm, pitch as a binder was added to the pulverized coke to aggregate the coke, and then a block-shaped formed body having a density of 1.6 g/cm$^3$ to 1.9 g/cm$^3$ was produced at an isotropic pressure. The block-shaped formed body was fired at a temperature of 2,800° C. to be graphitized. Next, the graphitized block-shaped formed body was pulverized, and sieved using a 250 mesh sieve to obtain graphite particles B having an average particle size (median diameter D50) of 23 μm.

[Production of Negative Electrode]

First, 40 parts by mass of the graphite particles A, 55 parts by mass of the graphite particles B, and 5 parts by mass of SiO were mixed, and the resulting mixture was used as a negative electrode active material A contained in the half region on the outer surface side of the negative electrode active material layer. The negative electrode active material A, carboxymethyl cellulose (CMC), and styrene-butadiene copolymer rubber (SBR) were mixed at a mass ratio of 100:1:1 to prepare a negative electrode mixture slurry for the outer surface side. Further, 95 parts by mass of the graphite particles B and 5 parts by mass of SiO were mixed, and the resulting mixture was used as a negative electrode active material B contained in the half region on the negative electrode current collector side of the negative electrode active material layer. The negative electrode active material B, carboxymethyl cellulose (CMC), and styrene-butadiene copolymer rubber (SBR) were mixed at a mass ratio of 100:1:1 to prepare a negative electrode mixture slurry for the negative electrode current collector side.

The negative electrode mixture slurry for the negative electrode current collector side was applied to both surfaces of a copper foil having a thickness of 8 μm, the coating film was dried, and then the negative electrode mixture slurry for the outer surface side was applied onto the coating film and dried, and the coating film was rolled by a rolling roller to produce a negative electrode in which a negative electrode active material layer was formed on both surfaces of the negative electrode current collector. That is, the mass ratio of the graphite particles A to the graphite particles B in the half region on the outer surface side of the negative electrode active material layer is 40:55, and the mass ratio of the graphite particles A to the graphite particles B in the half region on the negative electrode current collector side of the negative electrode active material layer is 0:100. In the produced negative electrode, the internal porosities of the graphite particles A and B were measured to be 3% and 15%, respectively. The produced negative electrode was cut to a width of 58.6 mm and a length of 662 mm and used.

[Preparation of Non-Aqueous Electrolyte Solution]

In a non-aqueous solvent obtained by mixing ethylene carbonate (EC), methyl ethyl carbonate (MEC), dimethyl carbonate (DMC), and methyl acetate (MA) at a volume ratio of 16:4:70:10, LiPF$_6$ was dissolved at a concentration of 1.3 mol/L. This was used as a non-aqueous electrolyte solution. The viscosity of the non-aqueous electrolyte solution of Example 1 was 2.8 cP. The viscosity of the non-aqueous electrolyte solution was measured with a rotational viscometer. The same applies to the following Examples and Comparative Examples.

[Production of Non-Aqueous Electrolyte Secondary Battery]

(1) A positive electrode lead was attached to the positive electrode current collector, and a negative electrode lead was attached to the negative electrode current collector, and then the positive electrode and the negative electrode were wound with a separator made of polyethylene interposed therebetween to produce a wound electrode assembly.

(2) Insulating plates were disposed above and below the electrode assembly, respectively, the negative electrode lead was welded to a case body, the positive electrode lead was welded to a sealing assembly, and the electrode assembly was housed in the case body.

(3) The non-aqueous electrolyte solution was injected into the case body by a decompression method, the open end of the case body was sealed with the sealing assembly via a gasket. This was used as a non-aqueous electrolyte secondary battery.

Example 2

In a non-aqueous solvent obtained by mixing ethylene carbonate (EC), methyl ethyl carbonate (MEC), dimethyl carbonate (DMC), and methyl acetate (MA) at a volume ratio of 14:3:53:30, $LiPF_6$ was dissolved at a concentration of 1.3 mol/L. This was used as a non-aqueous electrolyte solution. The viscosity of the non-aqueous electrolyte solution was 2.4 cP. In Example 2, a non-aqueous electrolyte secondary battery was produced in the same manner as in Example 1 except that the non-aqueous electrolyte solution prepared as described above was used.

Example 3

In a non-aqueous solvent obtained by mixing ethylene carbonate (EC), methyl ethyl carbonate (MEC), dimethyl carbonate (DMC), and ethyl propionate (PE) at a volume ratio of 16:4:70:10, $LiPF_6$ was dissolved at a concentration of 1.3 mol/L. This was used as a non-aqueous electrolyte solution. The viscosity of the non-aqueous electrolyte solution was 3.1 cP. In Example 3, a non-aqueous electrolyte secondary battery was produced in the same manner as in Example 1 except that the non-aqueous electrolyte solution prepared as described above was used.

Comparative Example 1

In a non-aqueous solvent obtained by mixing ethylene carbonate (EC), methyl ethyl carbonate (MEC), and dimethyl carbonate (DMC) at a volume ratio of 20:5:75, $LiPF_6$ was dissolved at a concentration of 1.3 mol/L. This was used as a non-aqueous electrolyte solution. The viscosity of the non-aqueous electrolyte solution was 3.2 cP. In Comparative Example 1, a non-aqueous electrolyte secondary battery was produced in the same manner as in Example 1 except that the non-aqueous electrolyte solution prepared as described above was used.

Comparative Example 2

First, 95 parts by mass of the graphite particles B and 5 parts by mass of SiO were mixed, and the resulting mixture was used as a negative electrode active material C contained in the entire region of the negative electrode active material layer. The negative electrode active material C, carboxymethyl cellulose (CMC), and styrene-butadiene copolymer rubber (SBR) were mixed at a mass ratio of 100:1:1 to prepare a negative electrode mixture slurry. The negative electrode mixture slurry was applied to both surfaces of a copper foil having a thickness of 8 μm, the coating film was dried, and then the coating film was rolled by a rolling roller to prepare a negative electrode in which a negative electrode active material layer was formed on both surfaces of a negative electrode current collector. That is, the mass ratio of the graphite particles A to the graphite particles B in the half region on the outer surface side of the negative electrode active material layer is 0:100, and the mass ratio of the graphite particles A to the graphite particles B in the half region on the negative electrode current collector side of the negative electrode active material layer is 0:100. The produced negative electrode was cut to a width of 58.6 mm and a length of 662 mm and used.

In Comparative Example 2, a non-aqueous electrolyte secondary battery was produced in the same manner as in Example 1 except that the negative electrode produced as described above and the non-aqueous electrolyte solution prepared in Comparative Example 1 were used.

Comparative Example 3

A non-aqueous electrolyte secondary battery was produced in the same manner as in Example 1 except that the negative electrode produced in Comparative Example 1 was used.

[Measurement of Capacity Maintenance Rate in Rapid Charge Cycle]

The non-aqueous electrolyte secondary batteries of Examples and Comparative Examples were charged at a constant current up to 4.2 V at 1 C (4,600 mA) at an environmental temperature of 25° C. and then charged at a constant voltage up to 1/50 C at 4.2 V Thereafter, constant current discharge was performed up to 2.5 V at 0.5 C. This charge and discharge was taken as 1 cycle, and 100 cycles were performed. Then, the capacity maintenance rates in the rapid charge cycle of the non-aqueous electrolyte secondary batteries of Examples and Comparative Examples were determined by the following equation.

Capacity maintenance rate=(discharge capacity at 100 cycles/discharge capacity at 1 cycle)×100

[Measurement of Direct Current Resistance in Low-Temperature Environment]

The non-aqueous electrolyte secondary batteries of Examples and Comparative Examples were charged at a constant current up to 3.54 V at 0.3 C (1 C=4,700 mA) at an environmental temperature of 25° C. and then charged at a constant voltage up to 1/50 C. Thereafter, the battery was rested at an environmental temperature of −20° C. for 2 hours, and then charged at a constant current of 0.3 C to 3.54 V. Then, the battery was discharged at 0.3 C, and the voltage before discharge and the voltage after 10 seconds from the start of discharge were measured. The measured voltages were applied to the following equation to determine the direct current resistance (DCR) of each battery in a low-temperature environment.

DCR (Ω)=(voltage after 10 seconds−voltage before discharge)/current value

Table 1 summarizes the results of the capacity maintenance rate in the rapid charge cycle and DCR in a low-temperature environment of the non-aqueous electrolyte secondary batteries of Examples and Comparative Examples. The results show that as the value of the capacity maintenance rate in the rapid charge cycle is high, deterioration of rapid charge cycle characteristics was suppressed.

TABLE 1

| | Mass ratio of graphite particles A to graphite particles B | | | Battery characteristics | |
|---|---|---|---|---|---|
| | Half region on outer surface side | Half region on negative electrode current collector side | Non-aqueous solvent (volume ratio) | Capacity maintenance rate in rapid charge cycle | DCR in low-temperature environment |
| Example 1 | A:B = 40:55 | A:B = 0:100 | EC/MEC/DMC/MA (16/4/70/10) | 87% | 0.72 Ω |
| Example 2 | A:B = 40:55 | A:B = 0:100 | EC/MEC/DMC/MA (14/3/53/30) | 90% | 0.61 Ω |
| Example 3 | A:B = 40:55 | A:B = 0:100 | EC/MEC/DMC/PE (16/4/70/10) | 82% | 0.77 Ω |
| Comparative Example 1 | A:B = 40:55 | A:B = 0:100 | EC/MEC/DMC (20/5/75) | 81% | 0.78 Ω |
| Comparative Example 2 | A:B = 0:100 | A:B = 0:100 | EC/MEC/DMC (20/5/75) | 62% | 0.72 Ω |
| Comparative Example 3 | A:B = 0:100 | A:B = 0:100 | EC/MEC/DMC/MA (16/4/70/10) | 78% | 0.67 Ω |

Comparing Comparative Examples 1 and 2 having the same electrolyte solution composition, in Comparative Example 1 using the negative electrode in which the graphite particles A were contained more in the half region on the outer surface side than in the half region on the negative electrode current collector side when the negative electrode active material layer was divided into two equal parts in the thickness direction, the capacity maintenance rate in the rapid charge cycle was higher than that of Comparative Example 2, and deterioration of rapid charge cycle characteristics was suppressed. Furthermore, comparing Examples 1 to 3 and Comparative Example 1 using the same negative electrode, in Examples 1 to 3 using a non-aqueous electrolyte solution containing 10 vol % or more of methyl acetate or ethyl propionate, the capacity maintenance rate in the rapid charge cycle was higher than that of Comparative Example 1, and deterioration of rapid charge cycle characteristics was suppressed. Among Examples 1 to 3, in Examples 1 and 2 in which methyl acetate was used, the capacity maintenance rate in the rapid charge cycle was higher than that of Example 3, and deterioration of rapid charge cycle characteristics was suppressed. In particular, in Example 2 in which the non-aqueous electrolyte solution containing 30 vol % or more of methyl acetate was used, the value of the capacity maintenance rate in the rapid charge cycle was the highest. Furthermore, in Example 2, the value of DCR in a low-temperature environment was the lowest among Examples and Comparative Examples.

REFERENCE SIGNS LIST

10 Non-aqueous electrolyte secondary battery
11 Positive electrode
12 Negative electrode
13 Separator
14 Electrode assembly
15 Battery case
16 Case body
17 Sealing assembly
18, 19 Insulating plate
20 Positive electrode lead
21 Negative electrode lead
22 Protruding portion
23 Filter
24 Lower valve member
25 Insulating member
26 Upper valve member
27 Cap
28 Gasket
30 Graphite particle
34 Internal void
36 External void
40 Negative electrode current collector
42 Negative electrode active material layer
42a Half region on negative electrode current collector side
42b Half region on outer surface side

The invention claimed is:

1. A non-aqueous electrolyte secondary battery comprising: a positive electrode; a negative electrode; and a non-aqueous electrolyte solution, wherein the negative electrode includes a negative electrode current collector and a negative electrode active material layer provided on the negative electrode current collector, the negative electrode active material layer contains graphite particles A and graphite particles B as a negative electrode active material, an internal porosity of the graphite particles A is 5% or less, and an internal porosity of the graphite particles B is 8% to 20%, the graphite particles A are contained more in a half region on an outer surface side of the negative electrode active material layer than in a half region on a negative electrode current collector side of the negative electrode active material layer when the negative electrode active material layer is divided into two equal parts in a thickness direction, the non-aqueous electrolyte solution has a non-aqueous solvent containing a carboxylic acid ester represented by [Chemical Formula 1], and the carboxylic acid ester is contained in an amount of 5 vol % to 50 vol % with respect to a total of the non-aqueous solvent:

[Chemical Formula 1]

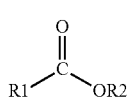
(I)

where R1 and R2 are each independently a hydrocarbon group having two or less carbon atoms.

2. The non-aqueous electrolyte secondary battery according to claim 1, wherein the carboxylic acid ester contains methyl acetate.

3. The non-aqueous electrolyte secondary battery according to claim 1, wherein a viscosity of the non-aqueous electrolyte solution is 3.1 cP or less.

4. The non-aqueous electrolyte secondary battery according to claim 1, wherein the negative electrode active material contains a Si-based material.

\* \* \* \* \*